(12) United States Patent
Takezawa et al.

(10) Patent No.: US 6,811,262 B2
(45) Date of Patent: Nov. 2, 2004

(54) PROJECTOR COMPRISING AN OPTICAL COMPONENT HAVING A ROCK CRYSTAL MEMBER

(75) Inventors: Takeshi Takezawa, Matsumoto (JP); Toshiaki Hashizume, Okaya (JP); Hisamaro Kato, Matsumto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/759,284

(22) Filed: Jan. 20, 2004

(65) Prior Publication Data

US 2004/0145711 A1 Jul. 29, 2004

Related U.S. Application Data

(63) Continuation of application No. 10/069,137, filed as application No. PCT/JP01/05378 on Jun. 22, 2001.

(30) Foreign Application Priority Data

Jun. 28, 2000 (JP) ........................................ 2000-193932

(51) Int. Cl.⁷ .................... G03B 21/14; G03B 21/26; G03B 21/20; G02F 1/1335; G02F 1/07
(52) U.S. Cl. .............................. 353/20; 353/30; 353/31; 353/102; 349/9; 359/256
(58) Field of Search .............................. 353/20, 30, 31, 353/33, 34, 37, 81, 82, 102, 122; 359/256, 487, 489, 500; 349/5, 6, 7, 8, 9

(56) References Cited

U.S. PATENT DOCUMENTS

| 4,650,286 A | 3/1987 | Koda et al. ................. 350/331 |
| 5,056,896 A | 10/1991 | Iimura et al. ................. 359/63 |
| 5,206,752 A | 4/1993 | Itoh et al. ................... 359/106 |
| 5,359,455 A | 10/1994 | Oishi ........................ 359/487 |
| 5,566,367 A | 10/1996 | Mitsutake et al. .......... 359/497 |
| 6,229,646 B1 | 5/2001 | Mitsutake et al. .......... 359/487 |
| 6,327,237 B2 | 12/2001 | Yanagawa et al. ..... 369/112.19 |
| 6,414,791 B1 | 7/2002 | Sugwara ..................... 359/497 |
| 6,529,228 B1 | 3/2003 | Koide ......................... 347/224 |
| 6,592,224 B2 * | 7/2003 | Ito et al. ...................... 353/20 |

FOREIGN PATENT DOCUMENTS

| EP | 1 031 877 A1 | 8/2000 | ........... G03F/1/114 |
| JP | A 1-319001 | 12/1989 | ............ G02B/3/00 |
| JP | A 2-311801 | 12/1990 | ............ G02B/3/00 |
| JP | A 7-287246 | 10/1995 | ........... G02F/1/136 |
| JP | A 8-2998 | 1/1996 | ........... C30B/29/22 |
| JP | A 10-260396 | 9/1998 | ......... G02F/1/1335 |
| JP | A 2000-171676 | 6/2000 | ............ G02B/7/00 |

OTHER PUBLICATIONS

"Bob's Rock Shop"; Smoky Quartz Crystal, 2 pages; bkeller@rockhounds.com; Aug. 8, 1995.
"Rock Crystal, the Clear and Colorless Variety of Quartz"; 2 pages; Copyright 1995, 1996; Amethyst Galleries, Inc.

* cited by examiner

*Primary Examiner*—Rodney Fuller
*Assistant Examiner*—Melissa J Koval
(74) *Attorney, Agent, or Firm*—Oliff & Berridge, PLC

(57) ABSTRACT

The present invention provides a technique of readily manufacturing a projector. The projector comprises: an illumination optical system for emitting light; an electro-optical device for modulating the light emitted from the illumination optical system in response to image information; a projection optical system for projecting a modulated light generated by the electro-optical device; and an optical component having a rock crystal member composed of rock crystal, the optical component being located in an optical path including the illumination optical system and the projection optical system. For example, the optical component provided on a light incident side or a light exiting side of the electro-optical device has a rock crystal substrate 308G as the rock crystal member and a polarizing plate 302Go arranged on the substrate. It is preferable that a Z axis of the rock crystal substrate 308G is set to be substantially parallel to or substantially perpendicular to the surface of the substrate.

17 Claims, 11 Drawing Sheets

PROJECTOR COMPRISING AN OPTICAL COMPONENT HAVING A ROCK CRYSTAL MEMBER

TECHNICAL FIELD

This invention relates to a projector for projecting and displaying images.

BACKGROUND ART

Projectors display images by modulating light from an illumination optical system in response to image information (image signal) by a liquid crystal light valve, and projecting the modulated light onto a screen.

The liquid crystal light valve generally includes a liquid crystal panel and polarizing plates arranged on a light incident side and a light exiting side of the liquid crystal panel. The polarizing plate functions to allow transmission of only a light component in the direction of a polarization axis, while cutting off the other light components. The light entering the liquid crystal light valve is thus modulated in response to image information.

The polarizing plate generates heat during cutting off the light other than the light component in the direction of the polarization axis. The generated heat raises the temperature of the polarizing plate and causes distortion and deterioration of the polarizing plate. The distorted and deteriorated polarizing plate mistakenly allows transmission of non-target light while cutting off non-target light. The polarizing plate is conventionally attached to a glass plate like crown glass called white plate glass. But recently, the polarizing plate is attached to a sapphire substrate having a relatively high thermal conductivity, so as to suppress the temperature rise of the polarizing plate.

Manufacture of the sapphire substrate is, however, relatively difficult, which makes it rather difficult to manufacture the projector. This is ascribed to difficulties in production and processing of sapphire. This problem is common to all the projectors utilizing the sapphire member.

DISCLOSURE OF THE INVENTION

The object of the present invention is thus to solve the drawbacks of the prior art discussed above and to provide a technique of readily manufacturing a projector.

At least part of the above and the other related objects is attained by a first apparatus of the present invention, which includes: an illumination optical system for emitting light; an electro-optical device for modulating the light emitted from the illumination optical system in response to image information; a projection optical system for projecting a modulated light generated by the electro-optical device; and an optical component having a rock crystal member composed of rock crystal, the optical component being located in an optical path including the illumination optical system and the projection optical system.

The first apparatus of the present invention has the optical component including the rock crystal member composed of rock crystal. The rock crystal member is more easily manufactured than the conventionally used sapphire member. This facilitates manufacture of the optical component including the rock crystal member and thereby manufacture of the projector. Rock crystal has a higher thermal conductivity than the conventionally used glass. Another advantage is thus to suppress a temperature rise of the optical component.

In one preferable application, the rock crystal member is disposed in such a manner that a Z axis of the rock crystal is substantially perpendicular to a center axis of a light passing through the rock crystal member.

In rock crystal, the thermal conductivity of a plane parallel to the Z axis is higher than the thermal conductivity of a plane perpendicular to the Z axis. The above arrangement thus further suppresses the temperature rise of the optical component and homogenizes an in-plane temperature distribution in a face perpendicular to the center axis of the light.

In this application, when the light passing through the rock crystal member is linearly polarized light, it is preferable that the rock crystal member is disposed in such a manner that the Z axis of the rock crystal is substantially parallel to or substantially perpendicular to an electric vector of the linearly polarized light.

This arrangement effectively ensures little variation in polarizing state when the linearly polarized light passes through the rock crystal, which is an optically uniaxial crystal.

In another preferable application, the rock crystal member is disposed in such a manner that a Z axis of the rock crystal is substantially parallel to a center axis of a light passing through the rock crystal member.

However, the polarizing state of light varies when the center axis of the light passing through the rock crystal member is not sufficiently parallel to the Z axis of the rock crystal. It is accordingly preferable that such a rock crystal member is disposed at a position that hardly utilizes specified polarized light such as the linearly polarized light or at a position that is hardly affected by the variation in polarizing state.

In one preferable embodiment of the above apparatus, the optical component has: a rock crystal substrate as the rock crystal member; and an optical element provided on the rock crystal substrate, and a Z axis of the rock crystal substrate is set to be substantially parallel to a surface of the substrate.

In this case, the heat of the optical element is transmitted parallel to the surface of the rock crystal substrate. This further suppresses the temperature rise of the optical component and homogenizes an in-plane temperature distribution of the optical component.

In this embodiment, it is preferable that the optical element is a polarizing plate, and the polarizing plate is provided on the rock crystal substrate in such a manner that a polarization axis of the polarizing plate is substantially parallel to or substantially perpendicular to a Z axis of the rock crystal.

In this arrangement, when the light output from the polarizing plate enters the rock crystal substrate, the polarizing state of the linearly polarized light output from the polarizing plate will be kept. On the other hand, when the light output from the rock crystal substrate enters the polarizing plate, only a predetermined linearly polarized light will be output by means of the polarizing plate. In the latter case, when the linearly polarized light enters the rock crystal substrate, the incident linearly polarized light will enter the polarizing plate with little variation in polarizing state.

In another preferable embodiment of the above apparatus, the optical component has: a rock crystal substrate as the rock crystal member; and an optical element provided on the rock crystal substrate, and a Z axis of the rock crystal substrate is set to be substantially perpendicular to a surface of the substrate.

However, the polarizing state of light varies when the center axis of the light passing through the rock crystal member is not sufficiently parallel to the Z axis of the rock crystal. It is accordingly preferable that such a rock crystal member is disposed at a position that hardly utilizes specified polarized light such as the linearly polarized light or at a position that is hardly affected by the variation in polarizing state.

In the above apparatus, it is preferable that the electro-optical device has a pair of substrates, at least one of the pair of substrates is a rock crystal substrate as the rock crystal member, and a Z axis of the rock crystal substrate is set to be substantially parallel to or substantially perpendicular to a surface of the substrate.

This arrangement effectively suppresses a temperature rise of the electro-optical device.

In the above apparatus, the rock crystal member may be a lens.

This arrangement effectively suppresses a temperature rise of the lens. In the structure that another optical element is attached to or arranged close to the lens, a temperature rise of the optical element will be also suppressed.

In one preferable application of the above apparatus, the illumination optical system may include a polarized light generation section for emitting a predetermined polarized light. The polarized light generation section may include: the optical component for dividing an incident light into two different polarized lights; and a selective retardation plate for adjusting one of the two polarized lights output from the optical component to the other. The optical component may include: a plurality of the rock crystal members arrayed in a predetermined direction; and a polarization separation film and a reflection film that are alternately arranged on interfaces of the plurality of rock crystal members.

In another preferable application of the above apparatus, the illumination optical system may include a polarized light generation section for emitting a predetermined polarized light. The polarized light generation section may include: the optical component for dividing an incident light into two different polarized lights; and a selective retardation plate for adjusting one of the two polarized lights output from the optical component to the other. The optical component may include: the rock crystal member; and a polarization separation film formed on the rock crystal member.

Either of the above applications desirably suppresses a temperature rise of the optical component. In the structure that a retardation plate is attached to the optical component, a temperature rise of the retardation plate will be also suppressed.

The present invention is also directed to a second apparatus, which includes: an illumination optical system for emitting light; a color light separation optical system that divides the light emitted from the illumination optical system into first through third color lights respectively having three color components; first through third electro-optical devices that modulate the first through the third color lights divided by the color separation optical system in response to image information, so as to generate first through third modulated lights; a color light composition optical system for combining the first through the third modulated lights; a projection optical system for projecting composite light output from the color light composition optical system; and an optical component having a rock crystal member composed of rock crystal, the optical component being located in an optical path including the illumination optical system and the projection optical system.

The second apparatus of the present invention has the optical component including the rock crystal member composed of rock crystal and thereby exerts the similar functions and advantages to those of the first apparatus.

In one preferable application of the above apparatus, at least one of the color light separation optical system and the color light composition optical system may include the optical component. The optical component may include: the four columnar rock crystal members divided by a substantially X-shaped interface; and a selector film formed on the interface to select light having wavelength in a predetermined range.

In another preferable application of the above apparatus, at least one of the color light separation optical system and the color light composition optical system may include the optical component. The optical component may include: the rock crystal member; and a selector film formed on the rock crystal member to select light having wavelength in a predetermined range.

These arrangement desirably suppresses a temperature rise of the optical component. Especially when an optical element, such as a polarizing plate or a retardation plate, is attached to the optical component, the arrangement also suppresses a temperature rise of the optical element.

BEST MODES OF CARRYING OUT THE INVENTION

Figure 1:
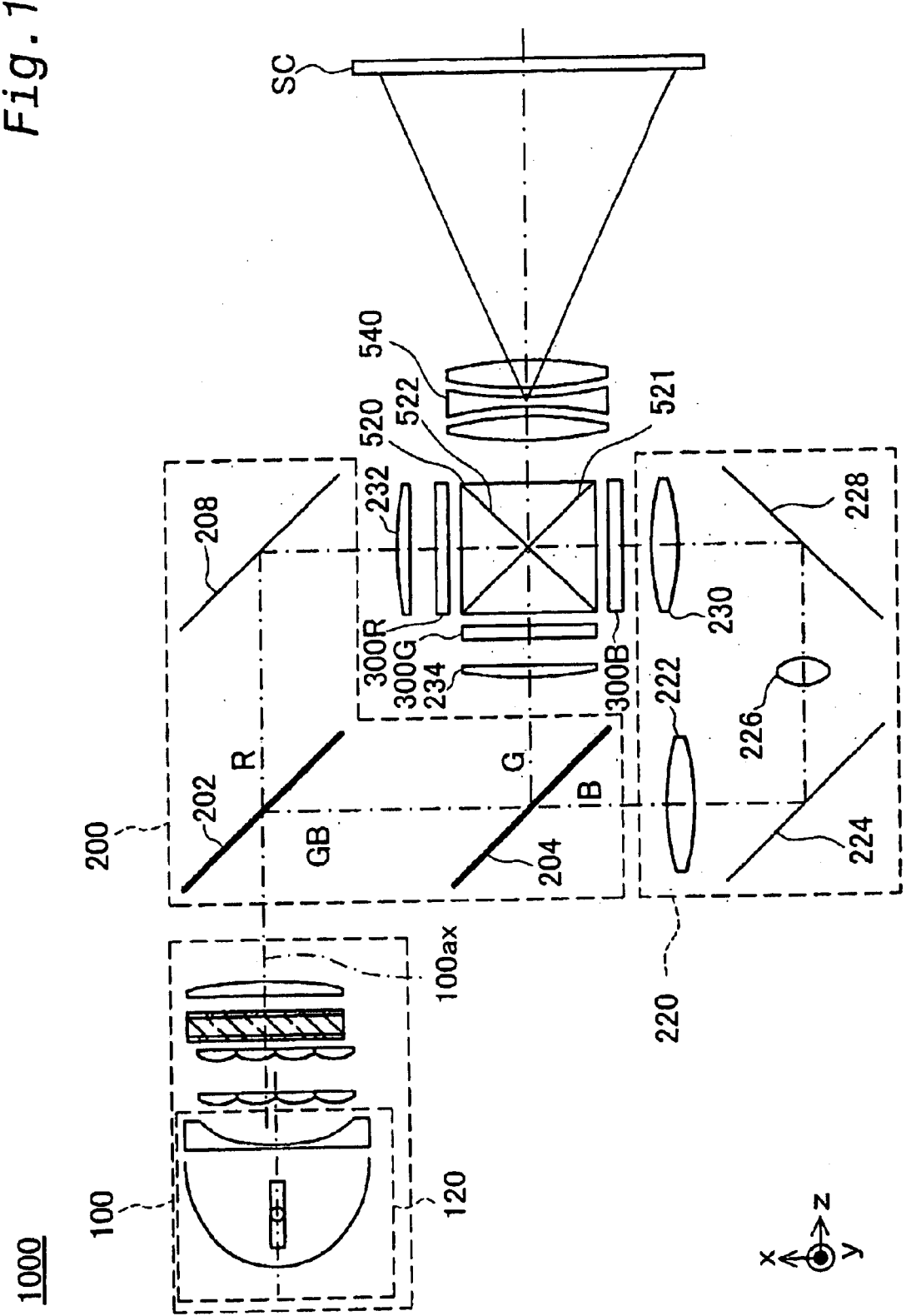
FIG. 1 illustrates a projector in one embodiment of the present invention.

A. General Structure of Projector:

One mode of carrying out the present invention is discussed below as a preferred embodiment. FIG. 1 illustrates a projector in one embodiment of the present invention. A projector 1000 comprises: an illumination optical system 100 including a light source device 120; a color light separation optical system 200; a relay optical system 220;

three liquid crystal light valves 300R, 300G and 300B; a cross dichroic prism 520; and a projection lens 540.

Light emitted from the illumination optical system 100 (FIG. 1) is separated into three color lights red (R), green (G), and blue (B) by the color light separation optical system 200. The respective separated color lights are modulated in response to image information by the liquid crystal light valves 300R, 300G, and 300B. The modulated color lights are combined to composite light by the cross dichroic prism 520, and a resulting color image is projected and displayed on a screen SC by the projection lens 540.

Figure 2:
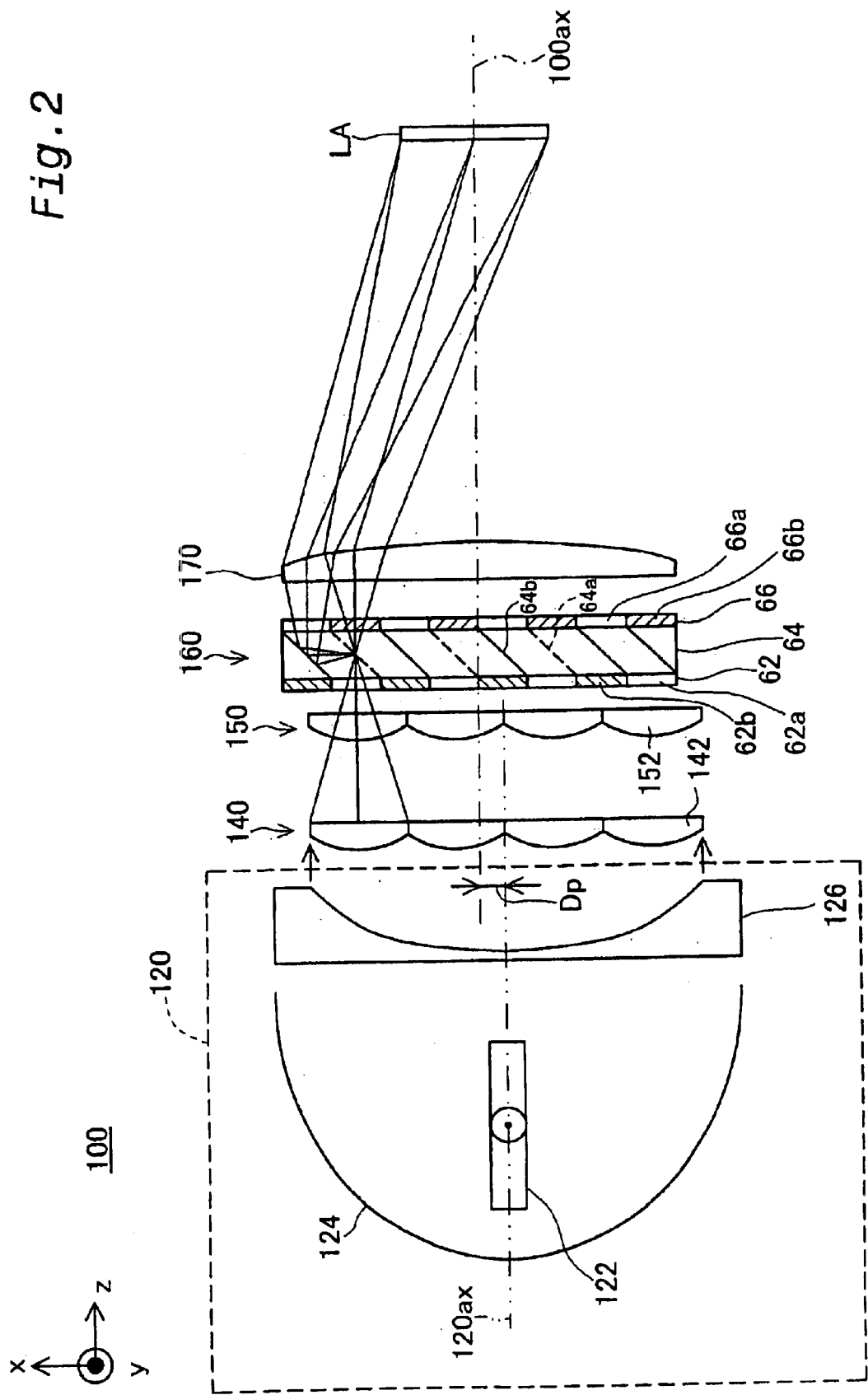
FIG. 2 is an enlarged view illustrating the illumination optical system 100 shown in FIG. 1.

FIG. 2 is an enlarged view illustrating the illumination optical system 100 shown in FIG. 1. The illumination optical system 100 comprises: the light source device 120; first and second lens arrays 140 and 150; a polarized light generation optical system 160; and a superimposing lens 170. The light source device 120 and the first and second lens arrays 140, 150 are aligned along to a light source optical axis 120ax. The polarized light generation optical system 160 and the superimposing lens 170 are, on the other hand, aligned along to a system optical axis 100ax. The light source optical axis 120ax represents the center axis of a light emitted from the light source device 120, and the system optical axis 100ax represents the center axis of a light emitted from an optical element after the polarized light generation optical system 160. As illustrated, the system optical axis 100ax and the light source optical axis 120ax are shifted substantially in parallel in the x direction by a predetermined deviation Dp. The deviation Dp will be discussed later. A lighting area LA illuminated with the illumination optical system 100 in FIG. 2 corresponds to the liquid crystal light valves 300R, 300G, and 300B of FIG. 1.

The light source device 120 functions to emit a substantially parallel light. The light source device 120 includes an arc tube 122, a reflector 124 having a concave face of ellipsoid of revolution, and a paralleling lens 126. Light emitted from the arc tube 122 are reflected by the reflector 124, and the reflected light is converted into a light substantially parallel to the light source optical axis 120ax by means of the paralleling lens 126. A reflector having a concave face of paraboloid of revolution may be applicable for the light source device.

The first lens array 140 has a plurality of small lenses 142 arranged in a matrix. Each small lens 142 is a plano-convex lens, and its outer shape seen from the z direction is set to be similar to the lighting area LA (the liquid crystal light valve). The first lens array 140 divides the substantially parallel light emitted from the light source device 120 into a plurality of sub-beams.

Like the first lens array 140, the second lens array 150 has a plurality of small lenses 152 arranged in a matrix. The second lens array 150 functions to adjust the respective center axes of the sub-beams output from the first lens array 140 to be substantially parallel to the system optical axis 100ax.

The sub-beams output from the respective small lenses 142 of the first lens array 140 are condensed via the second lens array 150 in the vicinity of it, or in the polarized light generation optical system 160.

Figure 3A:
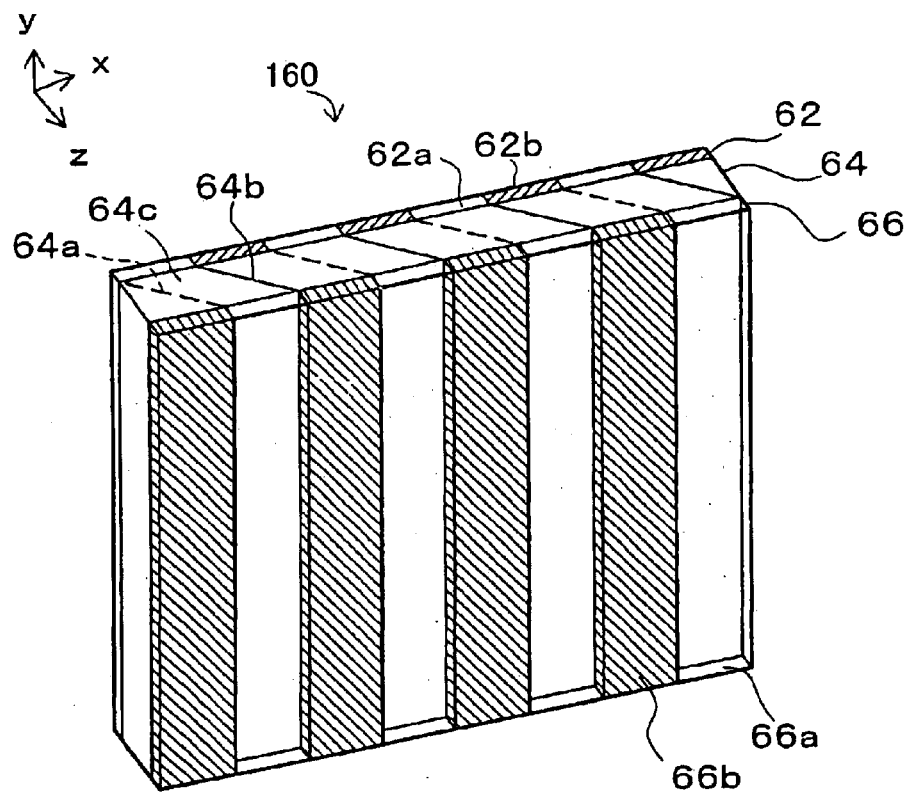
FIGS. 3(A) and 3(B) illustrate the polarized light generation optical system 160.
Figure 3B:
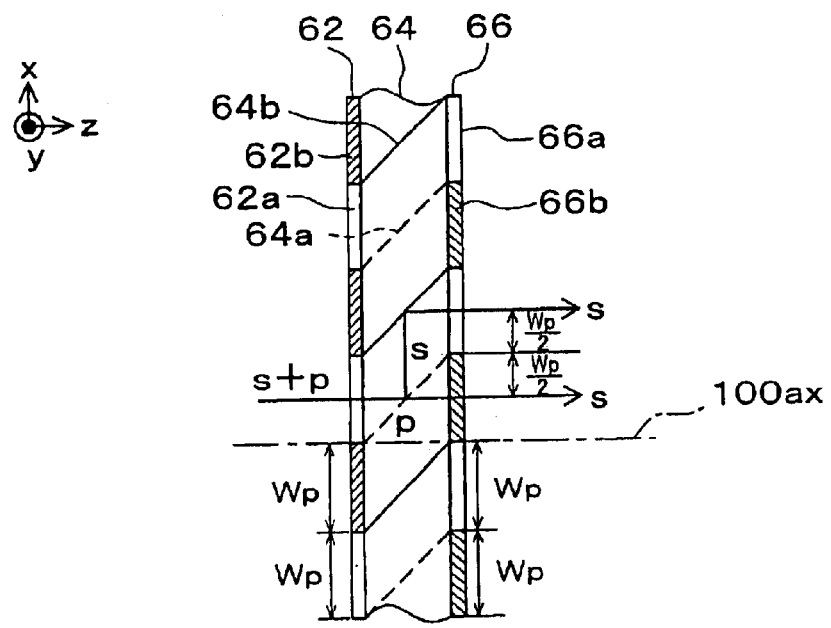

FIGS. 3(A) and 3(B) illustrate the polarized light generation optical system 160. FIG. 3(A) is a perspective view illustrating the polarized light generation optical system 160, and FIG. 3(B) is a plan view illustrating part of the polarized light generation optical system 160 seen from the +y direction. The polarized light generation optical system 160 includes a shading plate 62, a polarization beam splitter array 64, and a selective retardation plate 66. The polarized light generation optical system 160 corresponds to the polarized light generation section of the present invention.

As shown in FIG. 3(A), the polarization beam splitter array 64 is constructed by joining a plurality of columnar transmissive members 64c having a practically parallelogrammatic cross section. Polarization separation films 64a and reflection films 64b are alternately formed on the interfaces of the transmissive members 64c. A dielectric multi-layered film is used for the polarization separation film 64a, while a dielectric multi-layered film or a metal film is used for the reflection film 64b.

The shading plate 62 has shading faces 62b and open faces 62a arranged in stripe. The shading plate 62 shields the light that enter the shading faces 62b, while allowing passage of the light that enter the open faces 62a. The shading faces 62b and the open faces 62a are arranged to cause the sub-beams output from the first lens array 140 (FIG. 2) not to enter the reflection films 64b but to enter only the polarization separation films 64a of the polarization beam splitter array 64. More specifically, the center of each open face 62a of the shading plate 62 is substantially coincident with the center of each polarization separation film 64a of the polarization beam splitter array 64 as shown in FIG. 3(B). An opening width Wp of the open face 62a in the x direction is set to be substantially equal to the dimension of the polarization separation film 64a in the x direction. Under such conditions, each sub-beam passing through the open face 62a of the shading plate 62 does not enter the reflection film 64b but enters only the polarization separation film 64a. The shading plate 62 may be produced by partly forming a shading film (for example, a chromium film, an aluminum film, or a dielectric multi-layered film) on a flat transparent body (for example, a glass plate). The shading plate 62 may otherwise be a shading flat plate, such as an aluminum plate, with openings.

Each sub-beam output from the first lens array 140 (FIG. 2) has a principal ray (center axis) substantially parallel to the system optical axis 100ax, which enters the open face 62a of the shading plate 62 as shown by the solid line in FIG. 3(B). The sub-beam passing through the open face 62a enters the polarization separation film 64a. The polarization separation film 64a divides the incident sub-beam into an s-polarized sub-beam and a p-polarized sub-beam. The p-polarized sub-beam is transmitted through the polarization separation film 64a, whereas the s-polarized sub-beam is reflected by the polarization separation film 64a. The s-polarized sub-beam reflected by the polarization separation film 64a goes to the reflection film 64b and is further reflected by the reflection film 64b. The p-polarized sub-beam transmitted through the polarization separation film 64a is virtually parallel to the s-polarized sub-beam reflected by the reflection film 64b.

The selective retardation plate 66 has open layers 66a and $\lambda/2$ retardation layers 66b. Each open layer 66a allows transmission of incident linear polarized light. Each $\lambda/2$ retardation layer 66b has the function of a polarization conversion element that converts the incident linear polarized light into linear polarized light having an orthogonal polarization direction. In this embodiment, as shown in FIG. 3(B), the p-polarized sub-beam transmitted through the polarization separation film 64a enters the $\lambda/2$ retardation layer 66b. The p-polarized sub-beam is accordingly converted to the s-polarized sub-beam by the $\lambda/2$ retardation layer 66b. On the other hand, the s-polarized sub-beam reflected by the reflection film 64b enters the open layer 66a and is output without any change as the s-polarized sub-beam. Each non-polarized sub-beam entering the polarized light generation optical system 160 is thus converted to and output as the s-polarized sub-beam. In one applicable modification, the λ/2 retardation layers 66b are disposed only on the exiting faces of the s-polarized sub-beam reflected by the reflection films 64b. This arrangement enables each sub-beam entering the polarized light generation optical system 160 to be converted to and output as the p-polarized sub-beam. The selective retardation plate 66 may have vacancy at positions corresponding to the open layers 66a and simply include the λ/2 retardation layers 66b bonded to the exiting faces of either the p-polarized sub-beams or the s-polarized sub-beams.

As clearly understood from FIG. 3(B), the center of two s-polarized lights output from the polarized light generation optical system 160 is deviated from the center of the incident non-polarized light (s-polarized light+p-polarized light) in the +x direction. This deviation is equal to half the width Wp of the λ/2 retardation layer 66b (that is, the dimension of the polarization separation film 64a in the x direction). The light source optical axis 120ax is thus shifted from the system optical axis 100ax by a distance Dp equal to Wp/2 as shown in FIG. 2.

As described above, each of the plurality of sub-beams output from the first lens array 140 is divided into two groups and is converted to practically a single kind of linearly polarized light having the same polarization direction by means of the polarized light generation optical system 160. The plurality of sub-beams having the same polarization direction are superimposed on the lighting area LA by the superimposing lens 170 shown in FIG. 2. Here the light illuminating the lighting area LA has a substantially homogeneous distribution of intensity.

The illumination optical system 100 (FIG. 1) emits light having the same polarization direction (s-polarized light) and illuminates the liquid crystal light valves 300R, 300G, and 300B via the color light separation optical system 200 and the relay optical system 220.

The color light separation optical system 200 includes two dichroic mirrors 202 and 204, and a reflection mirror 208. This optical system functions to divide the light emitted from the illumination optical system. 100 into three color lights of red, green, and blue. The first dichroic mirror 202 allows transmission of a red light component of the light emitted from the illumination optical system 100, while reflecting a blue light component and a green light component. The red light R transmitted through the first dichroic mirror 202 is reflected by the reflection mirror 208 and goes toward the cross dichroic prism 520. The red light R output from the color light separation optical system 200 reaches the liquid crystal light valve 300R for red light through a field lens 232. This filed lens 232 functions to convert the each sub-beam emitted from the illumination optical system 100 into a beam parallel to the center axis thereof. Field lenses 234 and 230 provided on the respective light incident sides of the other liquid crystal light valves 300G and 300B have similar functions.

The blue light B and the green light G are reflected by the first dichroic mirror 202. The green light G is further reflected by the second dichroic mirror 204 and is output from the color light separation optical system 200 toward the cross dichroic prism 520. The green light G output from the color light separation optical system 200 goes through the field lens 234 and reaches the liquid crystal light valve 300G for green light. The blue light B transmitted through the second dichroic mirror 204 is, on the other hand, output from the color light separation optical system 200 and enters the relay optical system 220.

The blue light B entering the relay optical system 220 passes through the relay optical system 220, that is, an incident side lens 222, a relay lens 226, reflection mirrors 224 and 228, and an exiting side lens (field lens) 230, so as to reach the light crystal light valve 300B for blue light. The relay optical system 220 is used for the blue light B, since the optical path length of the blue light B is greater than those of the other color lights R and G. The use of the relay optical system 220 enables the blue light B entering the incident side lens 222 to be transmitted as-is to the exiting side lens 230.

The three liquid crystal light valves 300R, 300G, and 300B respectively modulate the incident three color lights in response to given image information (image signals) and generate modulated lights. Each liquid crystal light valve includes a liquid crystal panel and polarizing plates provided at the incident light side and exiting light side thereof. The details of the liquid crystal light valve will be discussed later.

The cross dichroic prism 520 combines the three color lights modulated through the liquid crystal light valves 300R, 300G, and 300B with one another to generate composite light representing a color image. The cross dichroic prism 520 has a red light reflection film 521 and a blue light reflection film 522 that are on interfaces of four rectangular prisms in a rough X shape. The red light reflection film 521 is composed of a dielectric multi-layered film that selectively reflects the red light. The blue light reflection film 522 is composed of a dielectric multi-layered film that selectively reflects the blue light. The combination of the red light reflection film 521 with the blue light reflection film 522 combines the three color lights together to generate composite light representing a color image.

The composite light generated by the cross dichroic prism 520 is output toward the projection lens 540. The projection lens 540 projects the composite light emitted from the cross dichroic prism 520 so as to display a color image on the screen SC. A telecentric lens may be applied for the projection lens 540.

Figure 4:
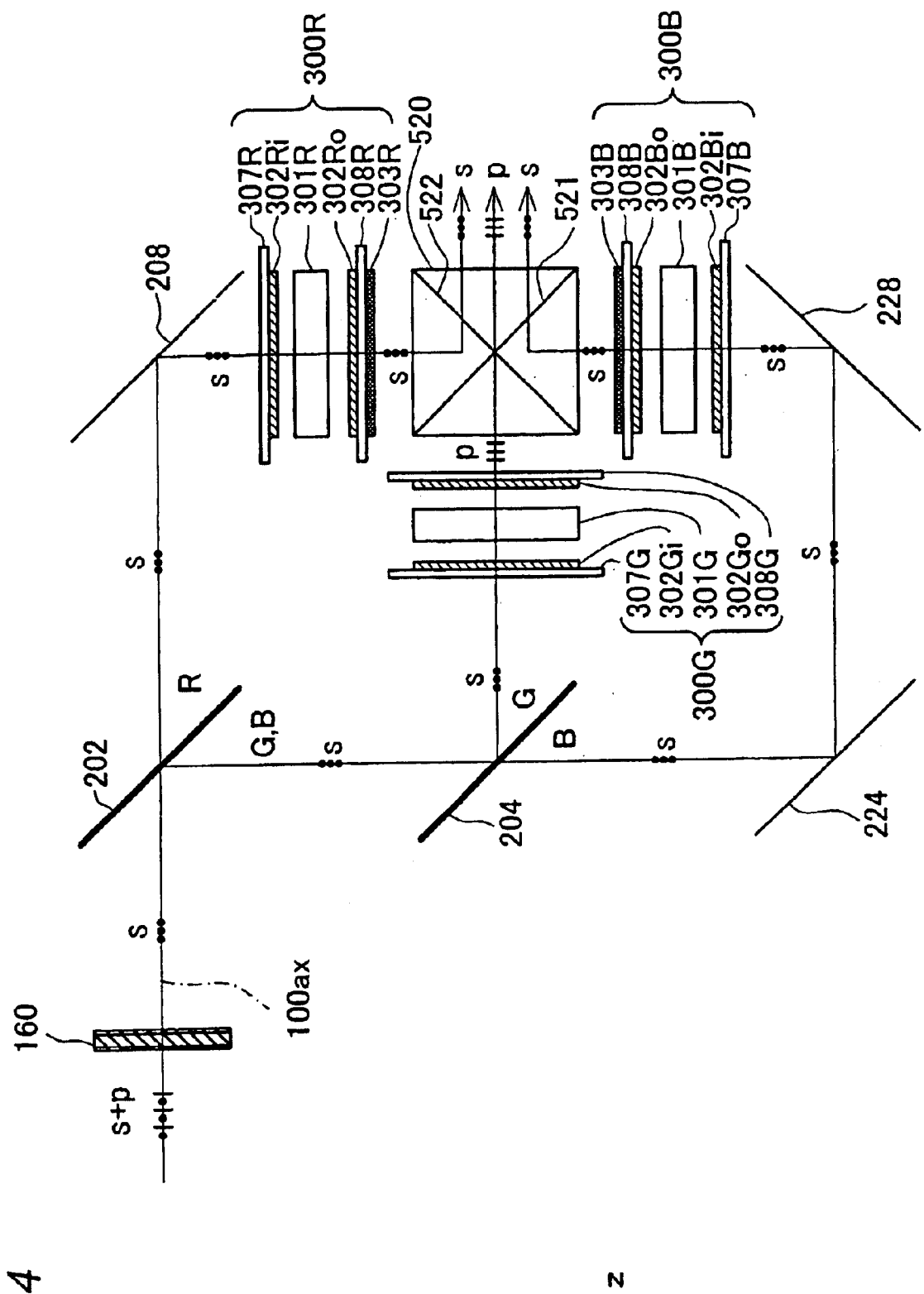
FIG. 4 illustrates the main part of the projector 1000 shown in FIG. 1.

FIG. 4 illustrates the main part of the projector 1000 shown in FIG. 1. The optical system from the polarized light generation optical system 160 to the cross dichroic prism 520 shown in FIG. 1 is schematically illustrated in FIG. 4 by taking into account the polarization direction.

As discussed previously with FIG. 2, the polarized light generation optical system 160 emits s-polarized light. The s-polarized light is separated into the red light R, the green light G, and the blue light B by means of the two dichroic mirrors 202 and 204 as described above. The polarization direction is not changed when the light passes through the dichroic mirrors 202 and 204, so that the three color lights are all the s-polarized light.

The s-polarized red light R separated by the first dichroic mirror 202 is reflected by the reflection mirror 208 and enters the first liquid crystal light valve 300R. The liquid crystal light valve 300R includes a liquid crystal panel 301R and two polarizing plates 302Ri, 302Ro arranged on the light incident side and the light exiting side of the liquid crystal panel 301R. A λ/2 retardation plate 303R is disposed on the light exiting side of the liquid crystal panel 301R. The first polarizing plate 302Ri is bonded to a first transmissive substrate 307R, whereas the second polarizing plate 302Ro and the λ/2 retardation plate 303R are bonded to a second transmissive substrate 308R. The polarization axes of the first and second polarizing plates 302Ri, 302Ro are arranged to be perpendicular to each other. The first polarizing plate 302Ri is an s-polarized light transmission polarizing plate that allows transmission of the s-polarized light. The second polarizing plate 302Ro is a p-polarized light transmission polarizing plate that allows transmission of the p-polarized light.

The s-polarized red light R entering the first liquid crystal light valve 300R is mostly transmitted through the transmissive substrate 307R and the s-polarized light transmission polarizing plate 302Ri, and enters the liquid crystal panel 301R. The liquid crystal panel 301R converts part of the incident s-polarized lights into p-polarized lights, and the p-polarized light transmission polarizing plate 302Ro arranged on the light exiting side emits only the p-polarized lights. The p-polarized light emitted from the p-polarized light transmission polarizing plate 302Ro enters the λ/2 retardation plate 303R via the transmissive substrate 308R and is converted to s-polarized light by the λ/2 retardation plate 303R.

The s-polarized green light G separated by the second dichroic mirror 204 enters the second liquid crystal light valve 300G. The second liquid crystal light valve 300G includes a liquid crystal panel 301G, an s-polarized light transmission polarizing plate 302Gi arranged on the light incident side of the liquid crystal panel 301G, and a p-polarized light transmission polarizing plate 302Go arranged on the light exiting side. The first and second polarizing plates 302Gi, 302Go are respectively bonded to transmissive substrates 307G, 308G. The s-polarized green light G entering the second liquid crystal light valve 300G is mostly transmitted through the transmissive substrate 307G and the s-polarized light transmission polarizing plate 302Gi, and enters the liquid crystal panel 301G. The liquid crystal panel 301G converts part of the incident s-polarized lights into p-polarized lights, and the p-polarized light transmission polarizing plate 302Go arranged on the light exiting side emits only the p-polarized lights. The p-polarized light emitted from the p-polarized light transmission polarizing plate 302Go mostly passes through the transmissive substrate 308G.

The s-polarized blue light B separated by the second dichroic mirror 204 is reflected by the two reflection mirrors 224, 228 and enters the third liquid crystal line valve 300B. The third liquid crystal light valve 300B includes a liquid crystal panel 301B, two polarizing plates 302Bi and 302Bo, a λ/2 retardation plate 303B, a first transmissive substrate 307B to which the first polarizing plate 303Bi is bonded, and a second transmissive substrate 308B to which the second polarizing plate 302Bo and the λ/2 retardation plate 303B are bonded. The structure of the third liquid crystal light valve 300B is identical with the structure of the first liquid crystal light valve 300R.

In the structure of this embodiment, the s-polarized light transmission polarizing plates 302Ri, 302Gi, 302Bi are all arranged on the respective light incident sides of the three liquid crystal light valves 300R, 300G, 300B, whereas the p-polarized light transmission polarizing plates 302Ro, 302Go, 302Bo are all arranged on their light exiting faces. The respective liquid crystal panels 301R, 301G, 301B have a same orientation of liquid crystal.

In this embodiment, the respective liquid crystal light valves are constructed in such a manner that the lights emitted from the first and third liquid crystal light valves 300R and 300B are s-polarized lights and the light emitted from the second liquid crystal light valve 300G is p-polarized light. This arrangement enhances the light utilization efficiency of the cross dichroic prism 520. The two reflection films 521, 522 formed in the cross dichroic prism 520 have the better reflection characteristic for the s-polarized light than that for the p-polarized light, and have the better transmission characteristic for the p-polarized light than that for the s-polarized light. The light to be reflected by the two reflection films 521, 522 is thus s-polarized light, while the light to be transmitted through the two reflection films 521, 522 is p-polarized light.

The first through the third liquid crystal panels 301R, 301G, 301B of this embodiment correspond to the first through the third electro-optical devices of the present invention.

B. Optical Component (a):

The transmissive substrates 307R, 307G, 307B, 308R, 308G, and 308B shown in FIG. 4 are rock crystal substrates composed of rock crystal. Here the rock crystal represents single crystal of $SiO_2$. The rock crystal may be artificial or natural.

Mass of the artificial rock crystal can be manufactured at once with a growth furnace known as an autoclave. The rock crystal has a lower hardness than that of sapphire, which is conventionally used for the transmissive substrate that holds the polarizing plate, and is readily processed to a predetermined shape. The rock crystal substrate is thus relatively easily manufactured.

Figure 5:
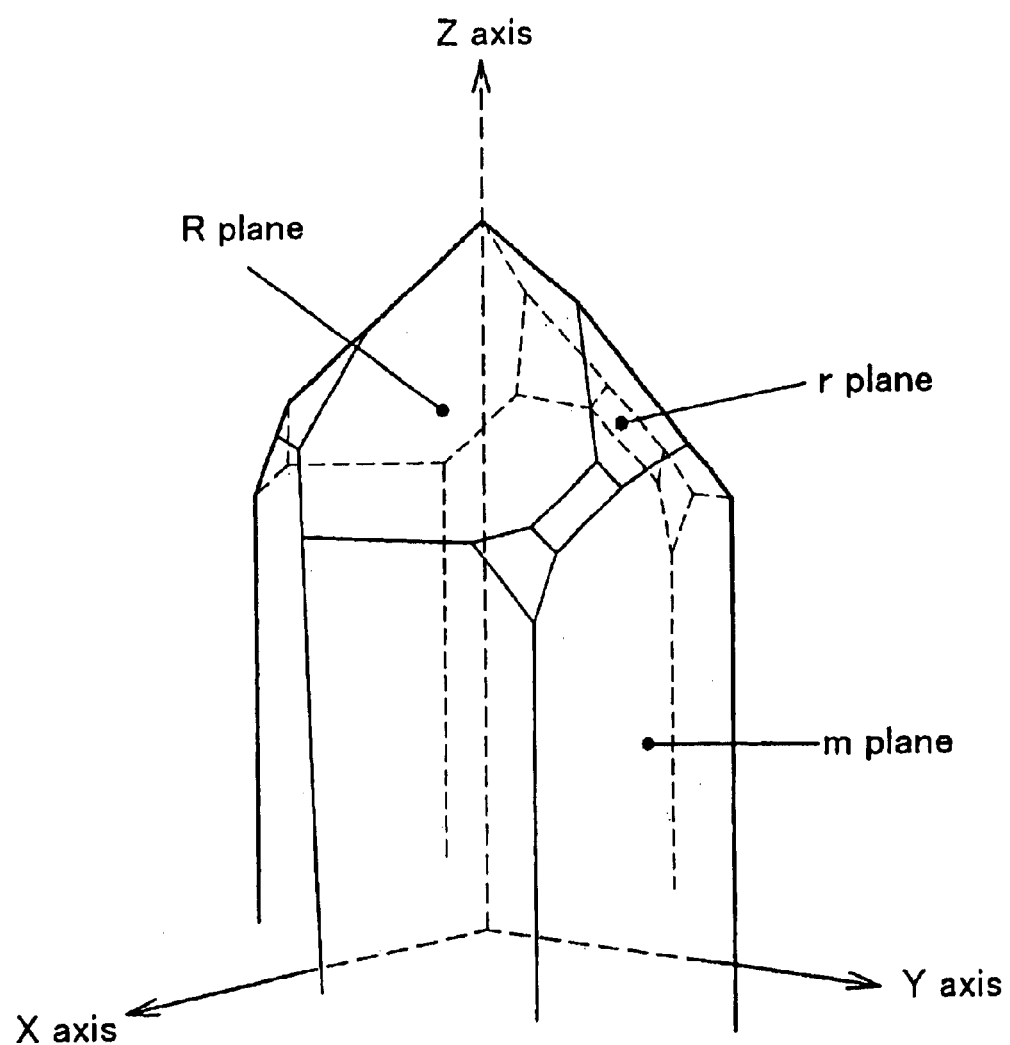
FIG. 5 illustrates the crystal structure of rock crystal.

FIG. 5 illustrates the crystal structure of rock crystal. The rock crystal is a crystal of trigonal system and is defined by crystal planes, that is, planes R, r, and m. X, Y, and Z axes of the rock crystal are specified as illustrated.

Figure 6A:
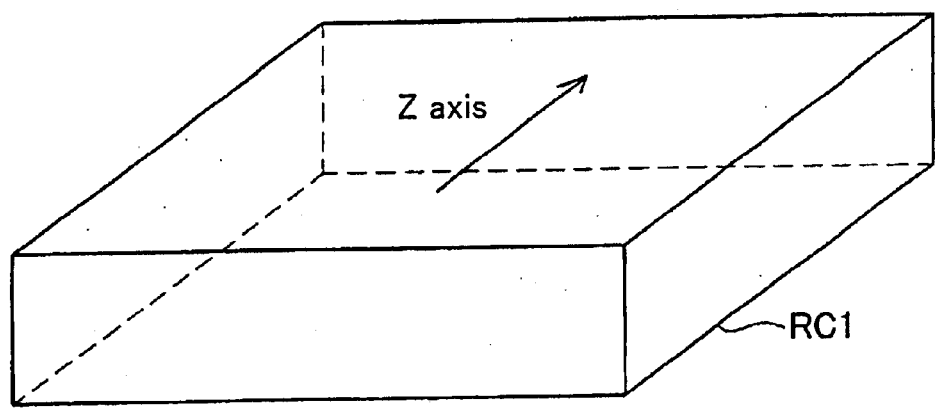
FIGS. 6(A) and 6(B) illustrate the rock crystal substrate used in the embodiment.
Figure 6B:
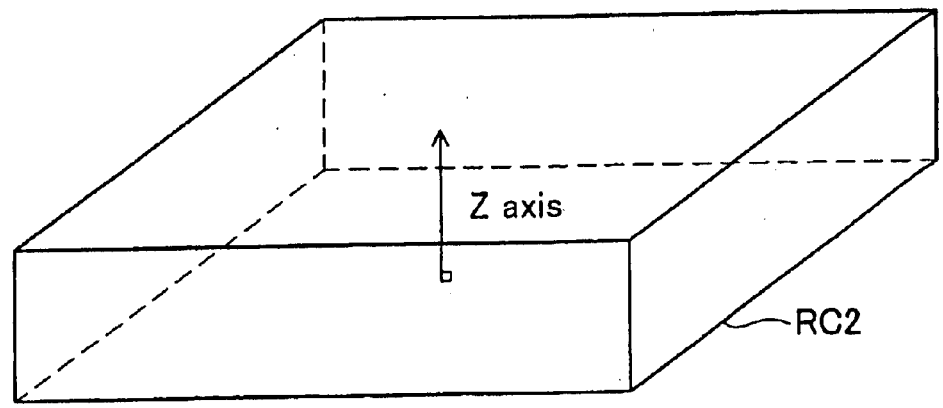

FIGS. 6(A) and 6(B) illustrate the rock crystal substrate used in this embodiment. FIG. 6(A) shows a rock crystal substrate RC1 having the Z axis of rock crystal arranged to be substantially parallel to the surface of the substrate, that is, to be included in the plane of the substrate. The rock crystal substrate RC1 is obtained by successively polishing the rock crystal shown in FIG. 5. For example, the rock crystal substrate RC1 is obtained by polishing the rock crystal in such a manner that a face parallel to the YZ plane defined by the Y axis and the Z axis shown in FIG. 5 forms the surface of the substrate.

FIG. 6(B) shows a rock crystal substrate RC2 having the Z axis of rock crystal arranged to be substantially perpendicular to the surface of the substrate. The rock crystal substrate RC2 is obtained by polishing the rock crystal in such a manner that a face parallel to the XY plane defined by the X axis and the Y axis shown in FIG. 5 forms the surface of the substrate.

Either of the rock crystal substrates shown in FIGS. 6(A) and 6(B) is applied for the transmissive substrates 307R, 307G, 307B, 308R, 308G, and 308B of this embodiment. The polarizing plate is bonded to the rock crystal substrate to maintain a predetermined relation.

Figure 7A:
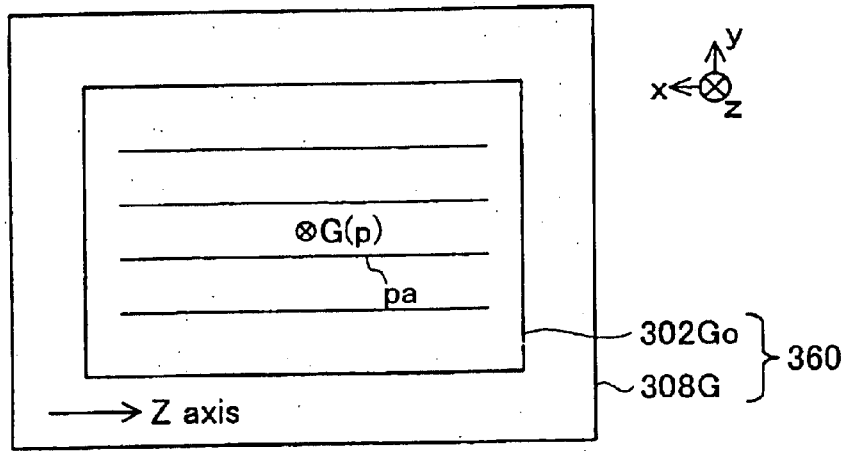
FIGS. 7(A) through 7(C) illustrate an optical component 360 provided on the light exiting side of the second liquid crystal light valve 300G (FIG. 4)
Figure 7B:
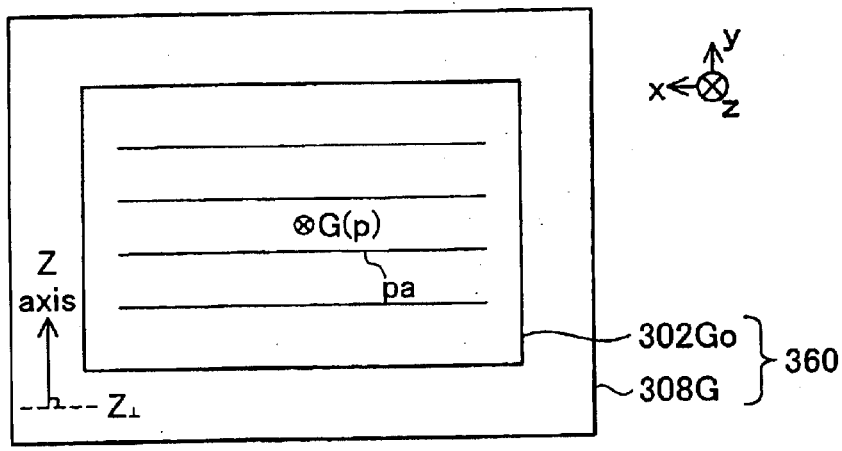
Figure 7C:
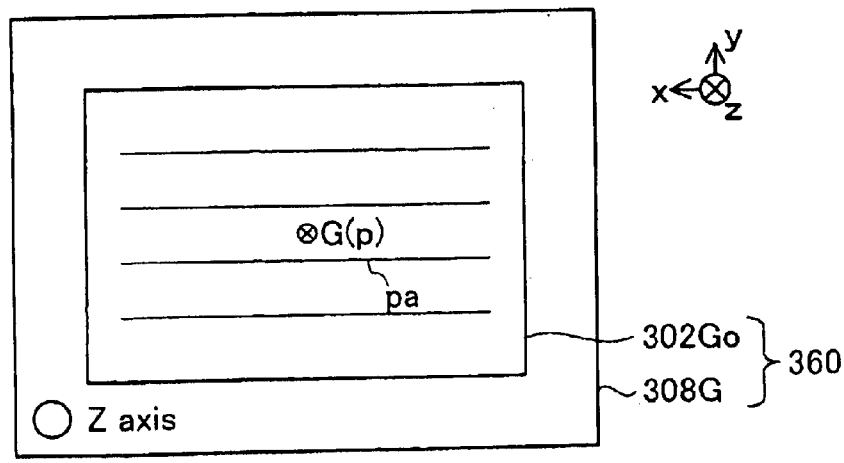

FIGS. 7(A) through 7(C) illustrate an optical component 360 provided on the light exiting side of the second liquid crystal light valve 300G (FIG. 4). The optical component 360 includes the rock crystal substrate 308G and the polarizing plate 302Go mounted on the rock crystal substrate 308G. FIGS. 7(A) through 7(C) show diverse relations between the rock crystal substrate 308G and the polarizing plate 302Go.

FIG. 7(A) uses the rock crystal substrate 308G having the Z axis of rock crystal that is arranged to be substantially parallel to the surface of the substrate as shown in FIG. 6(A). The polarizing plate 302Go is bonded to the rock crystal substrate 308G, such that a polarization axis pa of the polarizing plate 302Go is substantially parallel to the Z axis of the rock crystal substrate. More concretely, the polarizing plate 302Go is attached to the rock crystal substrate 308G, such that the inclined angle of the polarization axis pa relative to the Z axis of rock crystal is within about 3 degrees. As discussed later, the smaller inclined angle is desirable, and the preferable setting is, for example, within about 1 degree.

FIG. 7(B) also uses the rock crystal substrate 308G having the Z axis of rock crystal that is arranged to be substantially parallel to the surface of the substrate as shown in FIG. 6(A). In the example of FIG. 7(B), however, the polarizing plate 302Go is bonded to the rock crystal substrate 308G such that the polarization axis pa is substantially parallel to the Z axis of rock crystal. More concretely, the polarization plate 302Go is attached to the rock crystal substrate 308G, such that the inclined angle of the polarization axis pa relative to the Z⊥ direction substantially perpendicular to the Z axis is within about 3 degrees. In this example, the smaller inclined angle is desirable, and the preferable setting is, for example, within about 1 degree.

In FIGS. 7(A) and 7(B), the inclined angle is regulated to make the polarization axis pa of the polarizing plate 302Go substantially parallel to or substantially perpendicular to the Z axis of rock crystal, since the rock crystal is an optically uniaxial crystal. In rock crystal, the Z axis is an optic axis, and the refractive index in the Z-axis direction is different from the refractive index in the direction perpendicular to the Z axis. When light enters rock crystal, birefringence may change the polarizing state of light. As shown in FIGS. 7(A) and 7(B), when the travelling direction of the linearly polarized (p-polarized) green light G passing through the p-polarized light transmission polarizing plate 302Go is substantially perpendicular to the optic axis (Z axis) and the electric vector of the linearly polarized light is substantially parallel to or substantially perpendicular to the optic axis (Z axis), the linearly polarized light is emitted with little variation in polarizing state.

FIG. 7(C) uses the rock crystal substrate 308G having the Z axis of rock crystal that is arranged to be substantially perpendicular to the surface of the substrate as shown in FIG. 6(B). Here the polarization axis pa of the polarizing plate 302Go is kept substantially perpendicular to the Z axis of the rock crystal substrate 308G. The p-polarized green light G output from the polarizing plate 302Go travels practically in parallel to the optic axis (Z axis) of rock crystal. This leads to little variation in polarizing state of the light passing through the rock crystal substrate 308G. However, when the p-polarized green light G passing through the rock crystal substrate 308G is not sufficiently parallel to the Z axis of rock crystal, the polarizing state of light varies. It is accordingly preferable that the incident light entering the rock crystal substrate 308G is parallel to the Z axis of rock crystal.

In the case where the polarizing plate 302Go is arranged to face the liquid crystal panel 301G as shown in FIG. 4, even a variation in polarizing state of the rock crystal substrate 308G does not lower the contrast of the image light. In the arrangement of FIG. 7(C), it is not required to bond the polarizing plate 302Go to the rock crystal substrate 308G with high accuracy. This advantageously facilitates the process of bonding the polarizing plate 302Go to the rock crystal substrate 308G.

In the case of application of the rock crystal substrate 308G having the Z axis of rock crystal substantially parallel to the surface of the substrate as shown in FIGS. 7(A) and 7(B), the desirable arrangement is to make the light output from the polarizing plate 302Go enter the rock crystal substrate 308G as shown in FIG. 4. If the arrangement allows the light to enter the rock crystal substrate 308G and the polarizing plate 302Go in this sequence, the modulated light of the changed polarizing state through the rock crystal substrate 308G enters the polarizing plate 302Go. The polarizing plate 302Go cuts off part of the light to be transmitted and thereby lowers the contrast of the image light (modulated light) emitted from the liquid crystal light valve 300G. On the other hand, the arrangement as shown in FIG. 4 advantageously prevents a decrease in contrast of the image light emitted from the liquid crystal light valve 300G, even when the polarizing state of the linearly polarized light (p-polarized light) through the rock crystal substrate 308G changes a little.

By the way, the polarizing plate 302Go cuts off the light components other than a preset polarized light component (p-polarized light) in the incident modulated light emitted from the liquid crystal panel 301G, and accordingly generates heat. The generated heat deteriorates the polarizing plate. It is accordingly preferable to minimize the temperature rise of the polarizing plate.

The thermal conductivity of rock crystal in the direction parallel to the Z-axis is different from that in the direction perpendicular to the Z axis. The thermal conductivity of rock crystal is about 9.3 (W/(m·k)) in the direction parallel to the Z axis and about 5.4 (W/(m·k)) in the direction perpendicular to the Z axis. Namely the rock crystal has the higher thermal conductivity in the direction parallel to the Z axis.

Compared with the rock crystal substrate 308G having the Z axis of rock crystal that is arranged to be substantially perpendicular to the surface of the substrate as shown in FIG. 7(C), the rock crystal substrate 308G having the Z axis of rock crystal that is arranged to be substantially parallel to the surface of the substrate as shown in FIGS. 7(A) and 7(B) more effectively suppresses the temperature rise of the polarizing plate 302Go and homogenizes the in-plane temperature distribution of the polarizing plate 302Go.

It should be noted that the thermal conductivity of sapphire is higher than that of rock crystal. However, a relatively thicker rock crystal substrate exerts the equivalent heat dissipation effects to those of the sapphire substrate. For example, the heat dissipation effects of the sapphire substrate having the thickness of about 0.7 mm are equivalent to those of the rock crystal substrate having the thickness of about 1.5 mm.

FIGS. 7(A) through 7(C) regard the relation between the rock crystal substrate 308G and the polarizing plate 302Go disposed on the light exiting side of the second liquid crystal light valve 300G shown in FIG. 4. The similar relation is maintained between the rock crystal substrate 307G and the polarizing plate 302Gi disposed on the light incident side. In the latter case, the rock crystal substrate 307G is preferably arranged to make the Z axis of rock crystal substantially parallel to or perpendicular to the electric vector of the incident linearly polarized light (s-polarized light) and substantially parallel to the surface of the substrate. The rock crystal substrate 307G thus enables output of the s-polarized light with little variation in polarizing state of the incident s-polarized light. When the rock crystal substrate 307G is arranged to make the Z axis of rock crystal substantially perpendicular to the surface of the substrate, the rock crystal substrate 307G enables output of the s-polarized light with little variation in polarizing state of the incident s-polarized light that is substantially parallel to the Z axis of rock crystal.

It is further desirable that the rock crystal substrate 307G and the polarizing plate 302Gi are arranged to make the light output from the rock crystal substrate 307G enter the polarizing plate 302Gi as shown in FIG. 4. If the arrangement allows the light to enter the polarizing plate 302Gi and the rock crystal substrate 307G in this sequence, insufficient accuracy of the adjusted relation between the Z axis of the rock crystal substrate 307G and the polarization axis pa of the polarizing plate 302Gi causes the polarizing state of the linearly polarized light emitted from the polarizing plate 302Gi to be changed during passing through the rock crystal substrate 307G. The light other than the linearly polarized light may accordingly enter the liquid crystal panel 301G. In the arrangement that the Z axis of the rock crystal substrate 307G is substantially perpendicular to the surface of the substrate, and the incident light that is not sufficiently parallel to the Z axis of rock crystal also causes a variation in polarizing state. Such incident light into the liquid crystal panel 301G undesirably lowers the contrast of the image light emitted from the liquid crystal light valve 300G. Even when the rock crystal substrate 307G changes the polarizing state of the linearly polarized light (s-polarized light), however, the arrangement shown in FIG. 4 causes the light to pass through the polarizing plate 302Gi after the rock crystal substrate 307G. Only the linearly polarized light (s-polarized light) accordingly enters the liquid crystal panel 301G. This advantageously prevents a decrease in contrast of the image light emitted from the liquid crystal light valve 300G.

The above description regards the relation between the rock crystal substrate and the polarizing plate provided on the light incident side and the light exiting side of the second liquid crystal light valve 300G (FIG. 4). The similar relation should be maintained with regard to the other liquid crystal light valves 300R and 300B.

In should be noted that, in the second liquid crystal light valve 300G, only the polarizing plate 302Go is bonded to the rock crystal substrate 308G provided on the light exiting side. On the other hand, in the first and the third liquid crystal light valves 300R and 300B, the λ/2 retardation plates 303R, 303B as well as the polarizing plates 302Ro, 302Bo are attached to the rock crystal substrates 308R, 308B provided on the light exiting side. The λ/2 retardation plates 303R, 303B also generate heat during the light passing through them. Like the polarizing plates, the rock crystal substrates 308R, 308B function to suppress the temperature rise.

Each of the optical components provided on the light incident side and the light exiting side of the liquid crystal light valve, such as the optical component 360 shown in FIGS. 7(A) through 7(C), includes a rock crystal substrate as the rock crystal member; and optical elements like the polarizing plate and the λ/2 retardation plate mounted on the rock crystal substrate. The optical components composed of rock crystal are readily manufactured. This facilitates manufacture of the projector 1000. Rock crystal has a relatively high thermal conductivity and thus effectively suppresses the temperature rise of the optical component.

Figure 8:
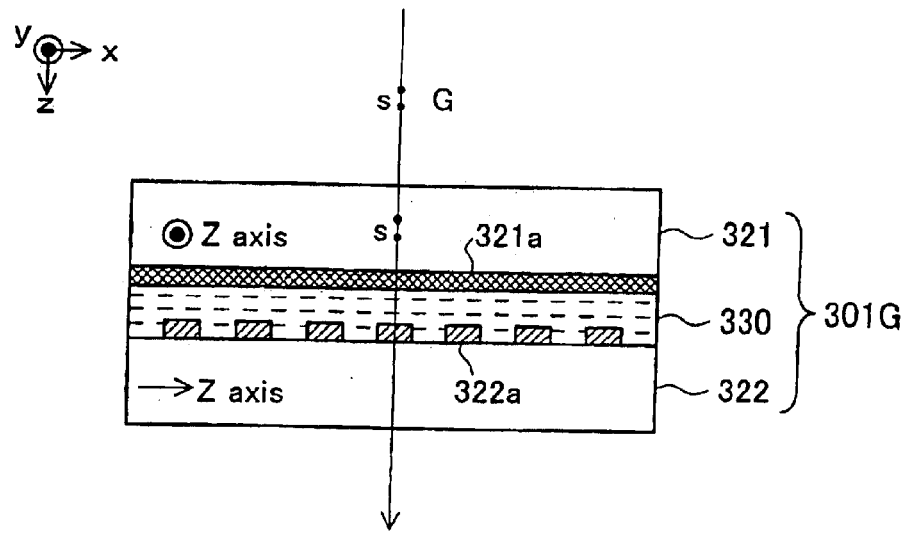
FIG. 8 schematically illustrates the optical component (liquid crystal panel) 301G included in the second liquid crystal light valve 300G (FIG. 4)

C. Optical Component (b):

FIG. 8 schematically illustrates the optical component (liquid crystal panel) 301G included in the second liquid crystal light valve 300G (FIG. 4). As illustrated, the liquid crystal panel 301G includes a pair of transmissive substrates 321 and 322; and a liquid crystal layer 330 interposed between the pair of transmissive substrates 321 and 322. A transparent common electrode 321a is formed on one face of the first transmissive substrate 321 facing the liquid crystal layer 330. Thin-film transistors (not shown) and transparent pixel electrodes 322a are formed in a matrix corresponding to the respective pixels on one face of the second transmissive substrate 322 facing the liquid crystal layer 330. The liquid crystal panel 301G is an active matrix-type. The liquid crystal panels 301R and 301B included in the other liquid crystal light valves 300R and 300B have same structure.

In FIG. 8, the pair of transmissive substrates 321 and 322 are rock crystal substrates. In the first rock crystal substrate 321, the Z axis of rock crystal is substantially parallel to both the surface of the substrate and the y axis. The s-polarized green light G entering the first rock crystal substrate 321 thus enters the liquid crystal layer 330 with little variation in polarizing state. The polarizing state of the s-polarized light entering and passing through the liquid crystal layer 330 changes with regard to each pixel. The modulated light is accordingly output from the liquid crystal layer 330. In the first rock crystal substrate 321, the Z axis of rock crystal may be arranged to be substantially parallel to the x axis. In the second rock crystal substrate 322, the Z axis of rock crystal is substantially parallel to both the surface of the substrate and the x axis. The modulated light entering the second rock crystal substrate 322 is accordingly output from the second rock crystal substrate 322 with little variation in polarizing state. In the second rock crystal substrate 322, the Z axis of rock crystal may be arranged to be substantially parallel to the y axis.

Each Z axis of the first and second rock crystal substrates 321, 322 is substantially parallel to the surface of the substrate in FIG. 8, but may be arranged to be substantially perpendicular to the surface of the substrate. The polarizing state of light hardly changes when the light passing through the rock crystal substrate 321 or 322 is substantially parallel to the Z axis of rock crystal. When the light passing through the rock crystal substrate 321 or 322 is not sufficiently parallel to the Z axis of rock crystal, however, the polarizing state of the polarized light changes. It is thus required to optimize the orientation and the type of liquid crystal corresponding to the degree of the change. The arrangement of making the Z axis of rock crystal substantially parallel to the surface of the substrate is more effective to suppress the temperature rise of the liquid crystal panel 301G. Namely the preferable arrangement is to make the Z axis of rock crystal substantially parallel to the surface of the substrate as shown in FIG. 8.

Application of the rock crystal substrates. 321, 322 as the transmissive substrates forming the light incident face and the light exiting face of the optical component (liquid crystal panel) 301G facilitates manufacture of the optical component 301G, while effectively suppressing the temperature rise of the optical component 301G.

Figure 9:
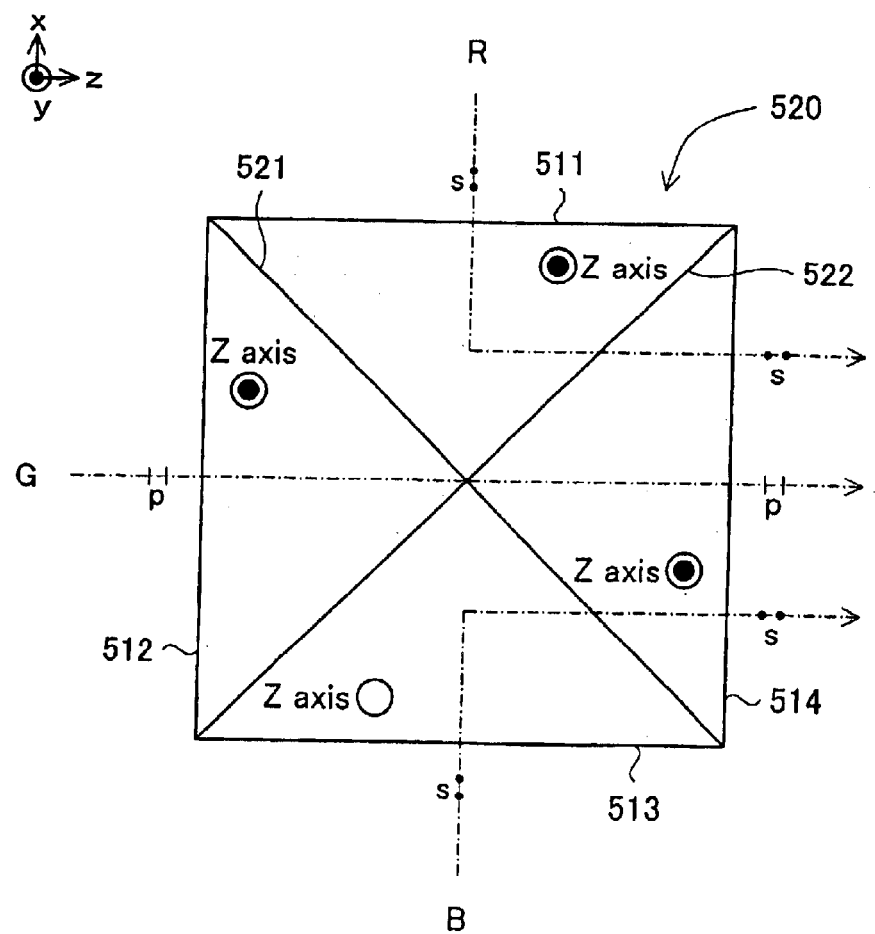
FIG. 9 is an enlarged view illustrating the optical component (cross dichroic prism) 520 provided as the color light composition optical system (FIG. 4)

D. Optical Component (c):

FIG. 9 is an enlarged view illustrating the optical component (cross dichroic prism) 520 provided as the color light composition optical system (FIG. 4). As discussed previously, the cross dichroic prism 520 includes four rectangular prisms (columnar rock crystal members) 511–514 that are divided by interfaces formed in a rough X shape. The red light reflection film 521 and the blue light reflection film 522 that selectively reflect lights having wavelengths in respective preset ranges are formed on the interfaces in the rough X shape.

In this optical component 520, the four rectangular prisms 511–514 are made of rock crystal. In FIG. 9, the Z axes of the four rectangular prisms 511–514 are substantially parallel to the y direction. Namely the rectangular prisms 511–514 are arranged in such a manner that each Z axis of rock crystal is kept to be substantially perpendicular to the center axis of the light passing through each rectangular prism. In FIG. 9, the lights passing through the four rectangular prisms 511–514 are linearly polarized light (s-polarized light or p-polarized light), and the rectangular prisms 511–514 are disposed such that each Z axis of rock crystal is kept to be substantially parallel to or substantially perpendicular to the electric vector of the linearly polarized light.

More concretely, the electric vector of the red light R (s-polarized light) entering the first rectangular prism 511 is substantially parallel to the Z axes of rock crystal of the two rectangular prisms 511, 514 before and after the reflection by the red light reflection film 521. Similar arrangement is observed for the blue light B (s-polarized light) entering the third rectangular prism 513. On the other hand, the electric vector of the green light G (p-polarized light) entering the second rectangular prism 512 is substantially perpendicular to the z axes of rock crystal of the four rectangular prisms 511–514 before and after the transmission through the two reflection films 521 and 522. The linearly polarized light entering the first through the third rectangular prisms 511—513 are output from the fourth rectangular prism 514 with little variation in polarizing state.

The Z axes of rock crystal, of the four rectangular prisms 511–514 are substantially parallel to the y direction in FIG. 9, but may be arranged to be substantially parallel to the z direction.

In the optical component (cross dichroic prism) 520 shown in FIG. 9, the four rectangular prisms 511–514 are made of rock crystal. Application of rock crystal facilitates manufacture of the optical component 520, while effectively suppressing the temperature rise of the optical component 520.

By the way, in FIG. 4, the λ/2 retardation plate 303R of the first liquid crystal light valve 300R is attached to the rock crystal substrate 308R, but may alternatively be attached to the light incident face of the first rectangular prism 511. In the latter case, the rectangular prism 511 functions to suppress the temperature rise of the λ/2 retardation plate 303R. The λ/2 retardation plate 303B of the third liquid crystal light valve 300B has the similar function. In FIG. 4, the polarizing plate 302Go of the second liquid crystal light valve 300G is attached to the rock crystal substrate 308G, but may alternatively be attached to the light incident face of the second rectangular prism 512. In the latter case, the rectangular prism 512 functions to suppress the temperature rise of the polarizing plate 302Go and allows omission of the rock crystal substrate 308G.

Although the cross dichroic prism 520 is used as the optical component of the color light composition optical system in this embodiment, another dichroic prism may be applied for the optical component.

Figure 10:
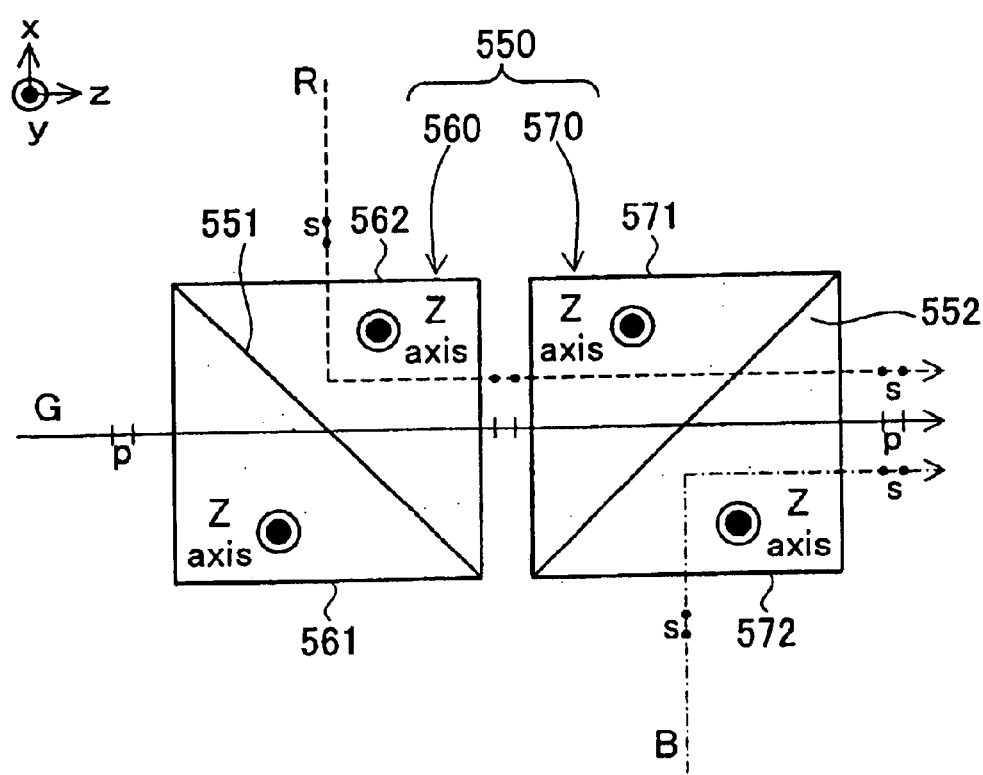
FIG. 10 illustrates another dichroic prism 550.

FIG. 10 illustrates another dichroic prism 550. This dichroic prism 550 includes two optical components (color selection prisms) 560 and 570.

The first color selection prism 560 has two rectangular prisms 561 and 562, and a red light reflection film 551 that selectively reflects the red light R is formed on the interface between the two rectangular prisms 561 and 562. Each of the rectangular prisms 561 and 562 is made of rock crystal, and the Z axis of rock crystal is set in the y direction. The second color selection prism 570 has a similar structure, and a blue light reflection film 552 that selectively reflects the blue light B is formed on the interface between two rectangular prisms 571 and 572.

Like the cross dichroic prism 520 of FIG. 9, the linearly polarized light entering the two rectangular prisms 561, 562 of the first color selection prism 560 and the second rectangular prism 572 of the second color selection prism 570 is output from the second rectangular prism 572 of the second color selection prism 570 with little variation in polarizing state.

By the way, the cross dichroic prism 520 of FIG. 9 and the dichroic prism 550 of FIG. 10 are used as the color light composition optical system for combining the three color lights. They may alternatively be used as the color light separation optical system when the traveling direction of light is reversed. If white light enters the light exiting face of the cross dichroic prism 520 or the dichroic prism 550 and the respective color lights output from its light incident face, the cross dichroic prism 520 or the dichroic prism 550 is applicable for the color light separation optical system. Namely either of these prisms 520 and 550 may be used for the color light separation optical system 200 shown in FIG. 1.

Figure 11:
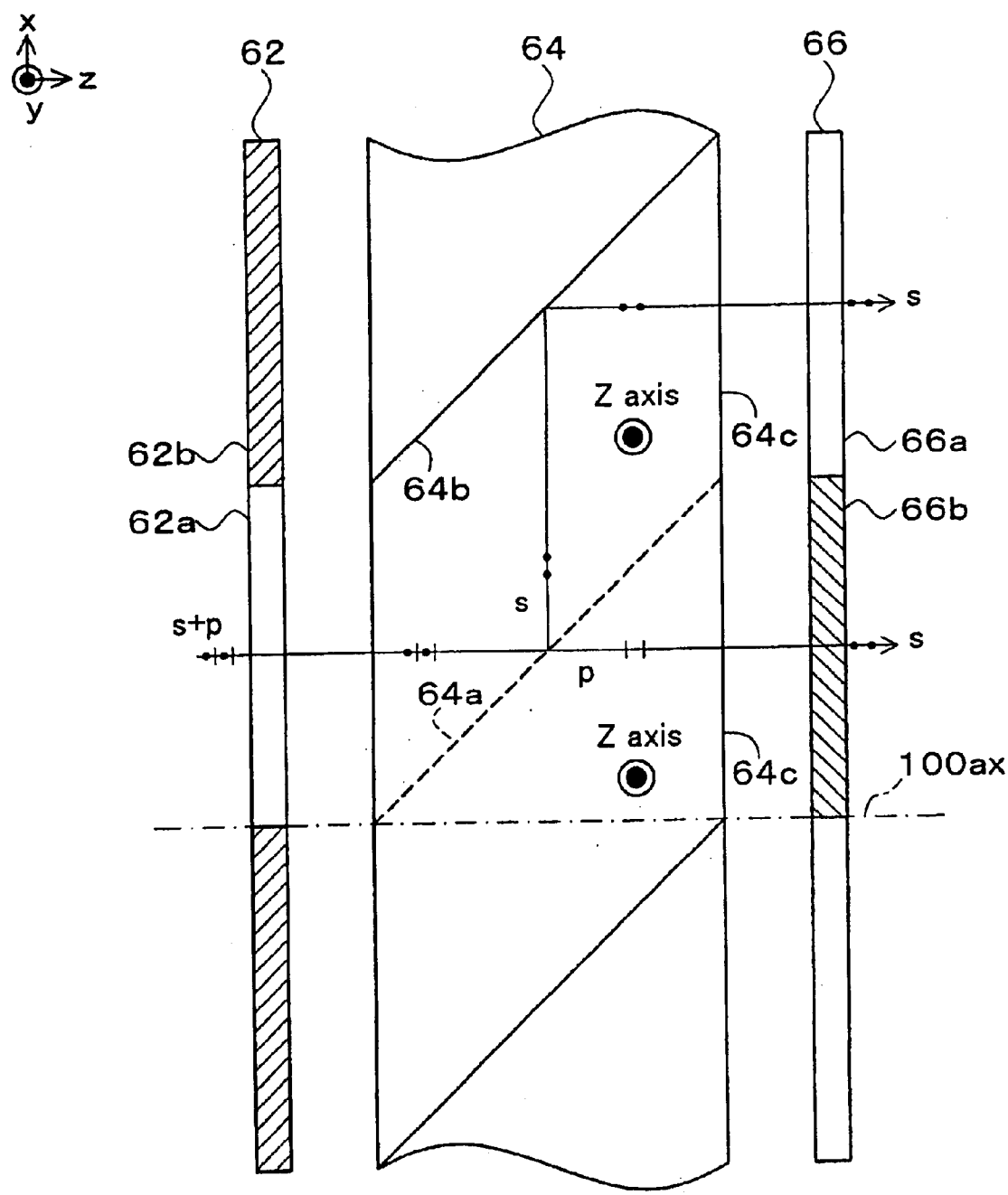
FIG. 11 is an enlarged view illustrating the optical component (polarization beam splitter array) 64 included in the illumination optical system 100 (FIG. 2)

E. Optical Component (d):

FIG. 11 is an enlarged view illustrating the optical component (polarization beam splitter array) 64 included in the illumination optical system 100 (FIG. 2). FIG. 11 is an enlarged view of FIG. 3(B). The shading plate 62 and the selective retardation plate 66 are illustrated apart to clarify the relation to FIG. 3(B).

As discussed previously with FIGS. 3(A) and 3(B), the polarization beam splitter array 64 is constructed by joining the plurality of columnar transmissive members 64c having the practically parallelogrammatic cross section. The polarization separation films 64a and the reflection films 64b are alternately formed on the interfaces of the respective adjoining transmissive members 64c.

The respective transmissive members 64c are rock crystal members made of rock crystal. In FIG. 11, the Z axis of rock crystal of each rock crystal member 64c is substantially parallel to the y direction. Namely each rock crystal member 64c is arranged in such a manner that the Z axis of rock crystal is kept to be substantially perpendicular to the center axis of the light passing through the rock crystal member 64c.

In the polarization beam splitter array 64, as shown in FIG. 11, the linearly polarized light (s-polarized light or p-polarized light) separated by the polarization separation film 64a goes through the rock crystal member 64c. In FIG. 11, the rock crystal member 64c is arranged such that the Z axis of rock crystal is kept to be substantially parallel to or substantially perpendicular to the electric vector of the linearly polarized light. Under such conditions, the s-polarized light and the p-polarized light separated by the polarization separation film 64a are output from the polarization beam splitter array 64 with little variation in polarizing state.

The optical component (polarization beam splitter array) 64 shown in FIG. 11 includes the transmissive members 64c made of rock crystal. Application of rock crystal facilitates manufacture of the optical component 64, while effectively suppressing the temperature rise of the optical component 64. Attachment of the shading plate 62 and the selective retardation plate 66 to the polarization beam splitter array 64 more effectively suppresses the temperature rise of the shading plate 62 and the selective retardation plate 66, and homogenizes the temperature distribution.

It should be noted that the Z axis of rock crystal of each rock crystal member 64c is substantially parallel to the y direction in FIG. 11, but may be arranged to be substantially parallel to the x direction or the z direction. In the structure that the shading plate 62 and the selective retardation plate 66 are bonded to the polarization beam splitter array 64, the arrangement of making the Z axis of rock crystal of each rock crystal member 64c substantially parallel to the y direction more effectively suppresses the temperature rise of the shading plate 62 and the selective retardation plate 66 and homogenizes the temperature distribution. In the case of the above modified direction of the Z axis of rock crystal, when the s-polarized light and the p-polarized light separated by the polarization separation film 64a travel in substantially parallel to the x direction or to the z direction, the s-polarized light and the p-polarized light are output from the polarization beam splitter array 64 with little variation in polarizing state.

The polarization beam splitter array 64 of FIG. 11 mounted on the projector 1000 of FIG. 11 may be replaced by a polarization beam splitter.

Figure 12:
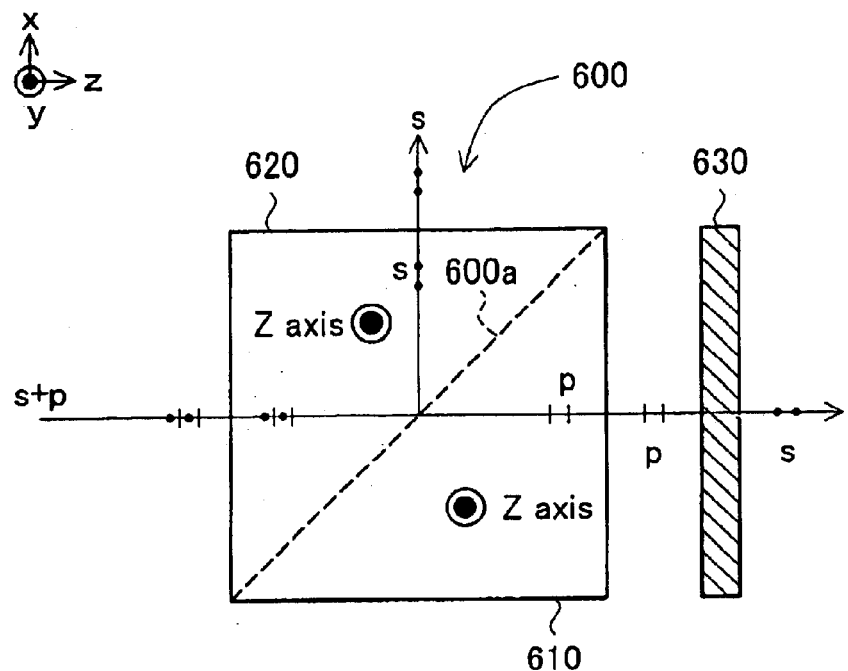
FIG. 12 illustrates a polarization beam splitter.

FIG. 12 illustrates a polarization beam splitter. This optical component (polarization beam splitter) 600 includes two transmissive members 610 and 620 of practically triangular prism. A polarization separation film 600a that divides incident non-polarized light (s+p) into s-polarized light and p-polarized light is formed on the interface of the two transmissive members 610 and 620. In the application of this polarization beam splatter 600 to the projector 1000, as shown in FIG. 12, a λ/2 retardation plate 630 is located on the light exiting face of the first transmissive member 610 to convert the p-polarized light output from the first transmissive member 610 into s-polarized light. A reflection mirror (not shown) is disposed on the light exiting side of the second transmissive member 620, so that the light emitted from the polarization beam splitter 600 travels in the z direction. It should be noted that the polarization beam splitter 600 corresponds to part of the polarization beam splitter array 64 shown in FIG. 11. Namely one block of the polarization beam splitter array 64 including the polarization separation film 64a corresponds to the polarization beam splitter 600.

In FIG. 12, the two transmissive members 610 and 620 are rock crystal members made of rock crystal. The Z axis of rock crystal of each rock crystal member 610 or 620 is substantially parallel to the y direction. The s-polarized light and the p-polarized light separated by the polarization separation film 600a are thus output from the polarization beam splitter 600 with little variation in polarizing state.

Such application facilitates manufacture of the polarization beam splitter 600 and effectively suppresses the temperature rise of the polarization beam splitter 600.

Each Z axis of rock crystal of the first and the second rock crystal members 610 and 620 is substantially parallel to the y direction in FIG. 12, but may be arranged to be substantially parallel to the x direction or the z direction. In the structure that the λ/2 retardation plate 630 is bonded to the polarization beam splitter 600, the arrangement of making the Z axis of rock crystal of each rock crystal member 610, 620 substantially parallel to the y direction more effectively suppresses the temperature rise of the λ/2 retardation plate 630, and homogenizes the temperature distribution. In the case of the above modified direction of the Z axis of rock crystal, when the s-polarized light and the p-polarized light separated by the polarization separation film 600a travel in substantially parallel to the x direction or to the z direction, the s-polarized light and the p-polarized light are output from the polarization beam splitter 600 with little variation in polarizing state.

Figure 13:
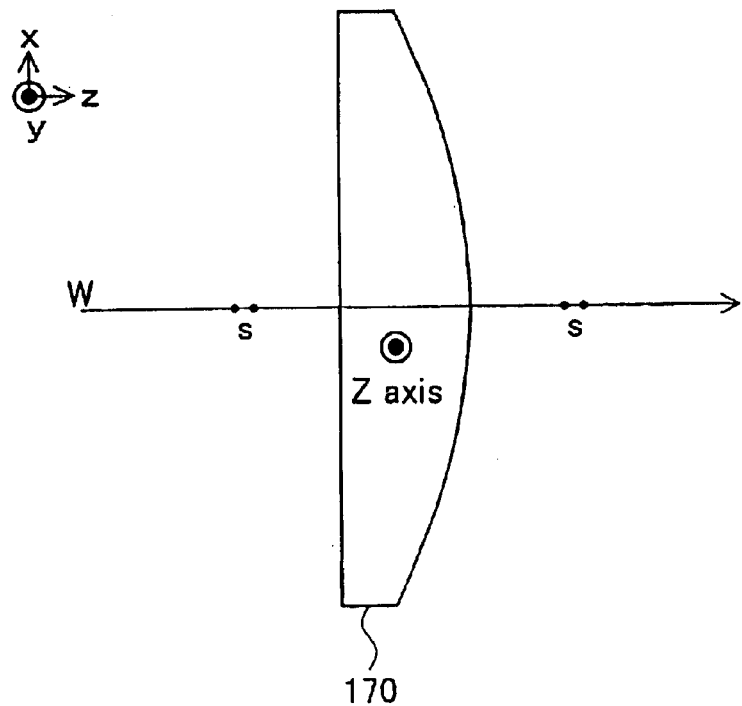
FIG. 13 illustrates the optical component (superimposing lens) 170 included in the illumination optical system 100 (FIG. 2).

F. Optical Component (e):

FIG. 13 illustrates the optical component (superimposing lens) 170 included in the illumination optical system 100 (FIG. 2). The superimposing lens 170 is made of rock crystal. The Z axis of rock crystal of the superimposing lens 170 is substantially parallel to the y direction in FIG. 13. The superimposing lens 170 is thus arranged, such that the Z axis of rock crystal is substantially perpendicular to the center axis of the light entering the superimposing lens 170 and is substantially parallel to the electric vector of the linearly polarized light (s-polarized light). The light traveling in the Z direction of rock crystal is thus output with little variation in polarizing state.

Such application more effectively suppresses the temperature rise of the superimposing lens 170 and homogenizes the in-plane temperature distribution of the superimposing lens 170.

It should be noted that the Z axis of rock crystal of the superimposing lens 170 is substantially parallel to the y direction in FIG. 13, but may be arranged to be substantially parallel to the x direction.

In FIG. 13, the present invention is applied for the superimposing lens 170 included in the illumination optical system 100 (FIG. 2), but may be applied for other lenses in the illumination optical system 100, for example the first and the second lens arrays 140, 160, as well as the field lenses 230, 232, 234 and the projection lens 540 shown in FIG. 1.

The Z axis of rock crystal of the superimposing lens 170 may alternatively be arranged to be substantially parallel to the z direction in the illustration of FIG. 13. The polarizing state of light hardly changes when the center axis of the light passing through the superimposing lens 170 is substantially parallel to the Z axis of rock crystal. Insufficient parallelism to the Z axis of rock crystal changes the polarizing state of light. It is accordingly preferable to locate the lens at a position that hardly utilizes specified polarized light such as the linearly polarized light or at a position that is hardly affected by the variation in polarizing state.

As discussed above, the diverse optical components including the rock crystal members made of rock crystal (see FIGS. 7 through 13) are disposed on the optical path including the illumination optical system 100 and the projection lens 540. Such arrangement facilitates manufacture of the optical components and thereby manufacture of the projector 1000.

The present invention is not restricted to the above embodiment or its modifications, but there may be many other modifications, changes, and alterations without departing from the scope or spirit of the main characteristics of the present invention. Some examples of possible modification are given below.

(1) In the above embodiment, as shown in FIG. 4, the polarizing plates 302Ri, 302Gi, 302Bi on the light incident sides of the first through the third liquid crystal light valves 300R, 300G, 300B are attached to the independently provided rock crystal substrates 307R, 307G, 307B. They may alternatively be attached to the rock crystal substrates 321 (FIG. 8) forming the light incident faces of the liquid crystal panels 301R, 301G, 301B. Such modification allows omission of the rock crystal substrates 307R, 307G, 307B on the light incident sides of the respective liquid crystal light valves. However, the attachment of the polarizing plates 302Ri, 302Gi, 302Bi to the independent rock crystal substrates 307R, 307G, 307B as shown in FIG. 4 advantageously ensures the greater effect on suppression of the temperature rise of the polarizing plates. It should be noted that the similar omission is allowed for the polarizing plates on the light exiting sides. In general, the optical component including an optical element mounted on the rock crystal substrate may be provided on at least one of the light incident side and the light exiting side of the liquid crystal light valve.

(2) In any of the optical components shown in FIGS. 7 through 13 of the above embodiment, the rock crystal member is arranged in such a manner that the Z axis of rock crystal is substantially perpendicular to or substantially parallel to the center axis of the light passing through the rock crystal member. However, when it is not required to take into account the effect of the variation in polarizing state, the Z axis of rock crystal may be oriented in another direction. The rock crystal member of such orientation also facilitates manufacture of the optical component and thereby manufacture of the projector, while effectively suppressing the temperature rise of the optical component. The only requirement is that the optical component including the rock crystal member made of rock crystal is provided on the optical path including the illumination optical system and the projection optical system.

(3) The above embodiment regards application of the present invention to the transmissive-type projector. The principle of the present invention is also applicable to a reflective-type projector. In the 'transmissive-type' projector, the electro-optical device working as the light modulation means allows transmission of light; for example, a transmissive-type liquid crystal panel. In the 'reflective-type' projector, on the other hand, the electro-optical device working as the light modulation means reflects light; for example, a reflective-type liquid crystal panel. Application of the present invention to the reflective-type projector ensures the similar advantages to those attained by application to the transmissive-type projector.

(4) In the above embodiment, the projector 1000 uses the liquid crystal panels as the electro-optical devices, but may instead use micromirror-type light modulation devices. A typical example of the micromirror-type light modulation device is DMD (digital micromirror device) (trade mark by TI Corporation). In general, any electro-optical device that modulates incident light in response to image information is applicable.

(5) The above embodiment regards the projector 1000 that displays color images. The present invention is also applicable to the projector that displays monochromatic images.

INDUSTRIAL APPLICABILITY

The present invention is applicable to a diversity of projectors that project and display images.

What is claimed is:

1. A projector comprising:
an illumination optical system for emitting a light;
an electro-optical device for modulating the light emitted from the illumination optical system in response to image information;
a projection optical system for projecting a modulated light generated by the electro-optical device; and
an optical component having a rock crystal member composed of rock crystal, the optical component being located in an optical path including the illumination optical system and the projection optical system, and the rock crystal member being disposed in such a manner that a Z axis of the rock crystal is set to be substantially parallel to a surface of the rock crystal member and that the Z axis of the rock crystal is substantially perpendicular to a center axis of a light passing through the rock crystal member.

2. The projector in accordance with claim 1, wherein the light passing through the rock crystal member is linearly polarized light, and
the rock crystal member is disposed in such a manner that the Z axis of the rock crystal is substantially parallel to or substantially perpendicular to an electric vector of the linearly polarized light.

3. The projector in accordance with claim 1,
wherein the rock crystal member is a lens, the light passing through the lens is linearly polarized light and the lens is disposed in such a manner that the Z axis of the rock crystal is substantially parallel to or substantially perpendicular to an electric vector of the linearly polarized light.

4. A projector comprising:
an illumination optical system for emitting a light;
an electro-optical device for modulating the light emitted from the illumination optical system in response to image information;
a projection optical system for projecting a modulated light generated by the electro-optical device; and
an optical component having a rock crystal member composed of rock crystal, the optical component being located in an optical path including the illumination optical system and the projection optical system,
wherein the rock crystal member is disposed in such a manner that a Z axis of the rock crystal is set to be substantially perpendicular to a surface of the rock crystal member and that the Z axis of the rock crystal is substantially parallel to a center axis of a light passing through the rock crystal member.

5. The projector in accordance with claim 4,
wherein the rock crystal member is a lens, and the lens is disposed in such a manner that the Z axis of the rock crystal is substantially parallel to the center axis of the light passing through the lens.

6. A projector comprising:
an illumination optical system for emitting a light;
a color light separation optical system that divides the light emitted from the illumination optical system into first through third color lights respectively having three color components;
first through third electro-optical devices that modulated the first through the third color lights by the color light separation optical system in response to image information, so as to generate first through third modulated lights;
a color light composition optical system for combining the first through the third modulated lights;
a projection optical system for projecting composite light output from the color light composition optical system; and
an optical component having a rock crystal member composed of rock crystal, the optical component being located in an optical path including the illumination optical system and the projection optical system, and the rock crystal member being disposed in such a manner that a Z axis of the rock crystal is set to be substantially parallel to a surface of the rock crystal member and that the Z axis of the rock crystal is substantially perpendicular to a center axis of a light passing through the rock crystal member.

7. The projector in accordance with claim 6, wherein the light passing through the rock crystal member is linearly polarized light, and
the rock crystal member is disposed in such a manner that the Z axis of the rock crystal is substantially parallel to or substantially perpendicular to an electric vector of the linearly polarized light.

8. The projector in accordance with claim 6,
wherein the rock crystal member is a lens, the light passing through the lens is linearly polarized light and the lens is disposed in such a manner that the Z axis of the rock crystal is substantially parallel to or substantially perpendicular to an electric vector of the linearly polarized light.

9. A projector comprising:

an illumination optical system for emitting a light;

a color light separation optical system that divides the light emitted from the illumination optical system into first through third color lights respectively having three color components;

first through third electro-optical devices that modulated the first through the third color lights by the color light separation optical system in response to image information, so as to generate first through third modulated lights;

a color light composition optical system for combining the first through the third modulated lights;

a projection optical system for projecting composite light output from the color light composition optical system; and an optical component having a rock crystal member composed of rock crystal, the optical component being located in an optical path including the illumination optical system and the projection optical system, wherein the rock crystal member is disposed in such a manner that a Z axis of the rock crystal is set to be substantially perpendicular to a surface of the rock crystal member and that the Z axis of the rock crystal is substantially parallel to a center axis of a light passing through the rock crystal.

10. The projector in accordance with claim 9, wherein the rock crystal member is a lens, and the lens is disposed in such a manner that the Z axis of the rock crystal is substantially parallel to the center axis of the light passing through the lens.

11. A projector comprising:

an illumination optical system for emitting a light;

a color light separation optical system that divides the light emitted from the illumination optical system into first through third color lights respectively having three color components;

first through third electro-optical devices that modulated the first through the third color lights by the color light separation optical system in response to image information, so as to generate first through third modulated lights;

a color light composition optical system for combining the first through the third modulated lights; and a projection optical system for projecting composite light output from the color light composition optical system, wherein at least one of the color light separation optical system and the color composition optical system comprises an optical component, and the optical component comprises:

a rock crystal member composed of rock crystal; and a selector film formed on the rock crystal member to select light having wavelength in a predetermined range, wherein the rock crystal member is disposed in such a manner that a Z axis of the rock crystal is set to be substantially parallel to a surface of the rock crystal member and that the Z axis of the rock crystal is substantially perpendicular to a center axis of a light passing through the rock crystal member.

12. A projector comprising:

an illumination optical system for emitting a light;

an electro-optical device for modulating the light emitted from the illumination optical system in response to image information;

a projection optical system for projecting a modulated light generated by the electro-optical device, and an optical component having a rock crystal substrate composed of rock crystal and a polarizing plate provided on the rock crystal substrate, the optical component being located in an optical path including the illumination optical system and the projection optical system.

13. The projector in accordance with claim 12, wherein the rock crystal substrate is disposed in such a manner that a Z axis of the rock crystal is set to be substantially parallel to a surface of the substrate, and the polarizing plate is provided on the rock crystal substrate in such a manner that a polarization axis of the polarizing plate is substantially parallel to or substantially perpendicular to the Z axis of the rock crystal.

14. The projector in accordance with claim 12, wherein the rock crystal substrate is disposed in such a manner that a Z axis of the rock crystal is set to be substantially perpendicular to a surface of the substrate, and the polarizing plate is provided on the rock crystal substrate in such a manner that a polarization axis of the polarizing plate is substantially perpendicular to the Z axis of the rock crystal.

15. A projector comprising:

an illumination optical system for emitting a light;

an electro-optical device for modulating the light emitted from the illumination optical system in response to image information; and a projection optical system for projecting a modulated light generated by the electro-optical device, wherein the electro-optical device has a pair of substrates, at least one of the pair of substrate is a rock crystal substrate composed of rock crystal.

16. The projector in accordance with claim 15, wherein a light entering the electro-optical device is linearly polarized light, and the rock crystal substrate is disposed in such a manner that a Z axis of the rock crystal is set to be substantially parallel to a surface of the substrate and that the Z axis of the rock crystal is substantially parallel to or substantially perpendicular to an electric vector of the linearly polarized light entering the electro-optical device.

17. The projector in accordance with claim 15, wherein the rock crystal substrate is disposed in such a manner that a Z axis of the rock crystal is set to be substantially perpendicular to a surface of the substrate and that the Z axis of the rock crystal is substantially parallel to a center axis of a light passing through the rock crystal substrate.

* * * * *